United States Patent [19]

Mansley

[11] Patent Number: 4,581,933
[45] Date of Patent: Apr. 15, 1986

[54] AIRCRAFT CASING INDICATOR SEAL

[75] Inventor: Ronald Mansley, Kintnersville, Pa.

[73] Assignee: Penn Airborne Products Company, Southampton, Pa.

[21] Appl. No.: 697,961

[22] Filed: Feb. 4, 1985

[51] Int. Cl.[4] .......................... G01D 11/26
[52] U.S. Cl. ..................... 73/431; 220/235; 324/156; 361/395
[58] Field of Search ............ 73/431; 116/305; 324/156; 361/395, 399; 220/235

[56] References Cited

U.S. PATENT DOCUMENTS

| | | | |
|---|---|---|---|
| 2,701,969 | 2/1955 | Meredith | 324/156 X |
| 2,753,074 | 7/1956 | Schmid | 220/235 |
| 3,586,056 | 6/1971 | Kipp | 220/235 X |
| 4,136,515 | 1/1979 | Thompson et al. | 73/431 X |
| 4,201,090 | 5/1980 | Davidson | 73/431 |
| 4,445,374 | 5/1984 | Huret | 73/431 X |
| 4,542,437 | 9/1985 | Ellis et al. | 361/395 |

Primary Examiner—Daniel M. Yasich
Attorney, Agent, or Firm—Howard C. Miskin

[57] ABSTRACT

A hermetically encased instrument includes a tubular housing with a front window glass, and a rear opening and a peripheral groove in its rear inside face, an instrument unit movably located in the housing and having a front meter observable through and limited in forward movement proximate the window glass; and a locking and sealing assembly mounted on the rear of the instrument unit and springs urging the asesmbly rearwardly, the assembly including a circular closure plate with a rearwardly facing stepped periphery engaging a rubber O-ring and a sealing plate coaxial with the closure plate and retained thereon by screws, the forwardly pressing of the assembly and the tightening of the screws loading the springs and distorting the O-ring into sealing engagement with the groove and the surrounding faces of the closure and sealing plates and housing to releasably lock the instrument unit in the housing and hermetically sealing the housing rear opening.

13 Claims, 6 Drawing Figures

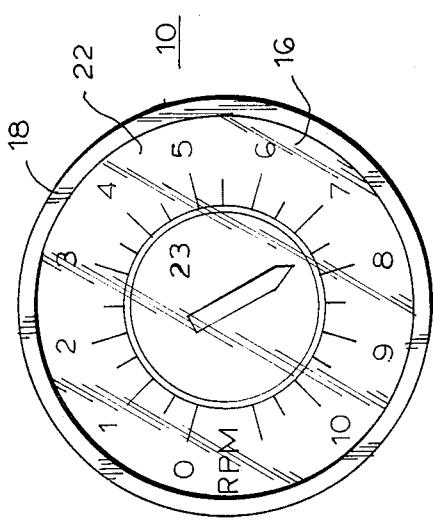
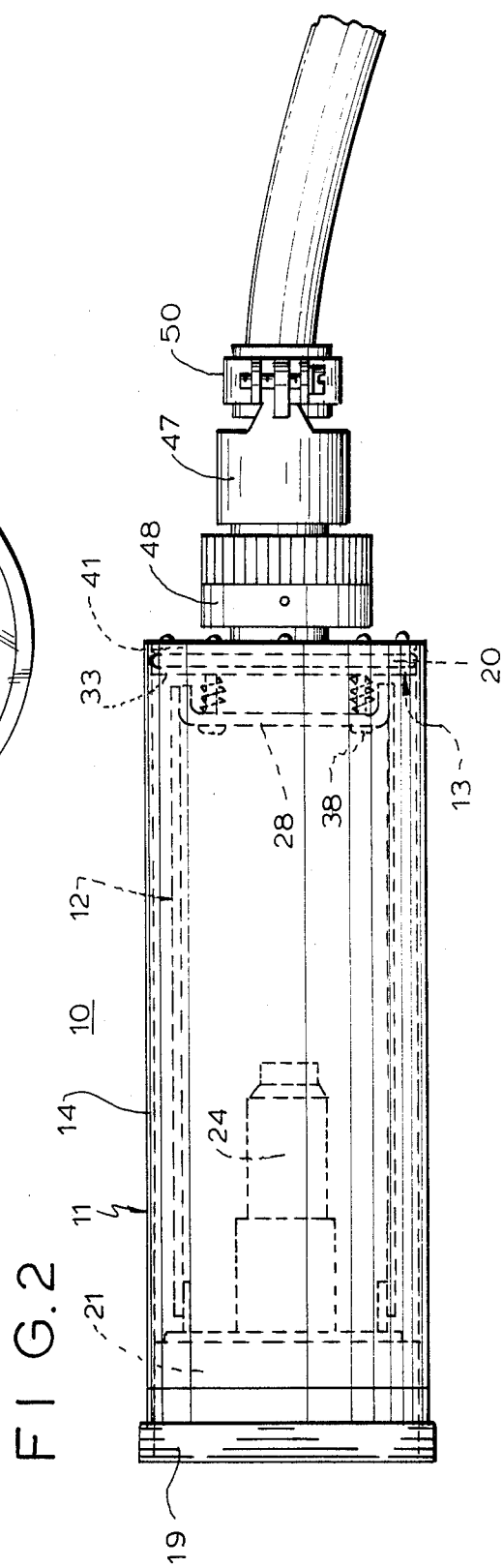
FIG. 1
FIG. 2

AIRCRAFT CASING INDICATOR SEAL

BACKGROUND OF THE INVENTION

The present invention relates generally to improvements in receptacles, enclosures or the like and it relates more particularly to an improved hermetically sealed housing for removably containing in a visually accessible condition, an indicating instrument as well as electrical circuitry associated therewith.

In many environments which are often subject to a wide range of ambient and frequently severe conditions, for example, in the cockpit or other areas of an aircraft or space vehicle, large numbers of information indicating instruments and associated circuit networks are located. Not only must these instruments be easily and rapidly visually accessible but the instruments and associated proximate electrical circuit networks must be completely protected and isolated from the ambient atmosphere but they must be easily physically accessible, removable for inspection, servicing, repair and maintenance and readily replaceable to their original sealed and protected condition. Many structures have been employed and proposed for this purpose but they possess numerous drawbacks and disadvantages. Access to the instruments and associated circuits were awkward, inconvenient and time consuming and the stability and the hermetic seal of the replaced instrument and circuit were frequently defective and unreliable, the structures possessed little versatility and adaptability, were often bulky and otherwise left much to be desired.

SUMMARY OF THE INVENTION

It is a principal object of the present invention to provide an improved hermetically sealed device.

Another object of the present invention is to provide an improved hermetically housed instrument and associated circuit network.

Still another object of the present invention is to provide an improved assembly of an instrument and associated circuit network in an hermetically sealed housing, in which the instrument and network may be readily removed from the housing for service, testing and maintenance and replaced in the housing and reliably hermetically resealed.

A further object of the present invention is to provide an improved hermetically housed structure of the above nature characterized by its reliability, simplicity, ruggedness, ease and convenience of replacing and servicing the housed unit an its great versatility and adaptability.

As used in this application, "hermetically sealed" refers to a seal structure which prevents air from invading a space under normal conditions. In the present invention, an "O" ring or gasket is used which maintains a good seal under normal conditions. Ordinarily, an "O" ring construction does not maintain an airtight seal under large changes of pressure or temperature, such as relative movement between seal level and high altitudes. In military applications, such "normal" use of an "O" ring is sometimes referred to as providing an "environmental seal." As used herein, "hermetically sealed" is used in the more general sense and would cover an "O" ring seal.

A hermetically housed structure in accordance with the present invention includes a tubular housing having a rear access opening, an instrument unit longitudinally slidably located in the housing and limited in its forward movement therein to a predetermined position, a closure member carried by and proximate the rear end of the instrument unit and in registry with the access opening and having a perimeter, proximate and complementing the inside face of the housing, a locking member corresponding in perimeter to that of the closure member and longitudinally movable relative thereto, the closure and locking members having confronting borders, a deformable resilient gasket sandwiched between the closure and locking member confronting borders and means for relatively contracting the closure and locking members to compress and clamp the gasket and outwardly distort it into sealing engagement with the housing inside face. Spring means which are compression loaded in the housing sealed condition, urge the unit forwardly relative to the closure member toward its forwardmost position.

In accordance with a preferred embodiment of the present invention the tubular housing is circular in transverse cross section and hermetically sealed at its front by a window glass locked in position by bezel collar and backed by a ring against which the instrument unit front face bears. The instrument unit includes a front cylindrical meter member facing the window glass and a pair of spaced parallel printed circuit boards mounted to and extending rearwardly from the rear member and connected at their rears to bridging brackets. The brackets are longitudinally movably connected to the rear closure member by longitudinal pins and loaded compression springs are entrapped between the brackets and closure member. The closure member and locking member are flat circular plates, one of which is stepped to provide a recess which engages an O-ring defining the gasket and the plates are held and contracted by a set of circularly spaced screws with the deformed O-ring engaging a peripheral groove in the housing inside face.

The improved hermetically housed instrument is simple and rugged, easy and convenient to replace and service and is of great versatility and adaptability.

BRIEF DESCRIPTION OF THE DRAWINGS

FIG. 1 of the drawings is a front elevational view of a housed tachometer embodying the present invention;

FIG. 2 is a side elevational view thereof;

DESCRIPTION OF THE PREFERRED EMBODIMENT

Figure 3:
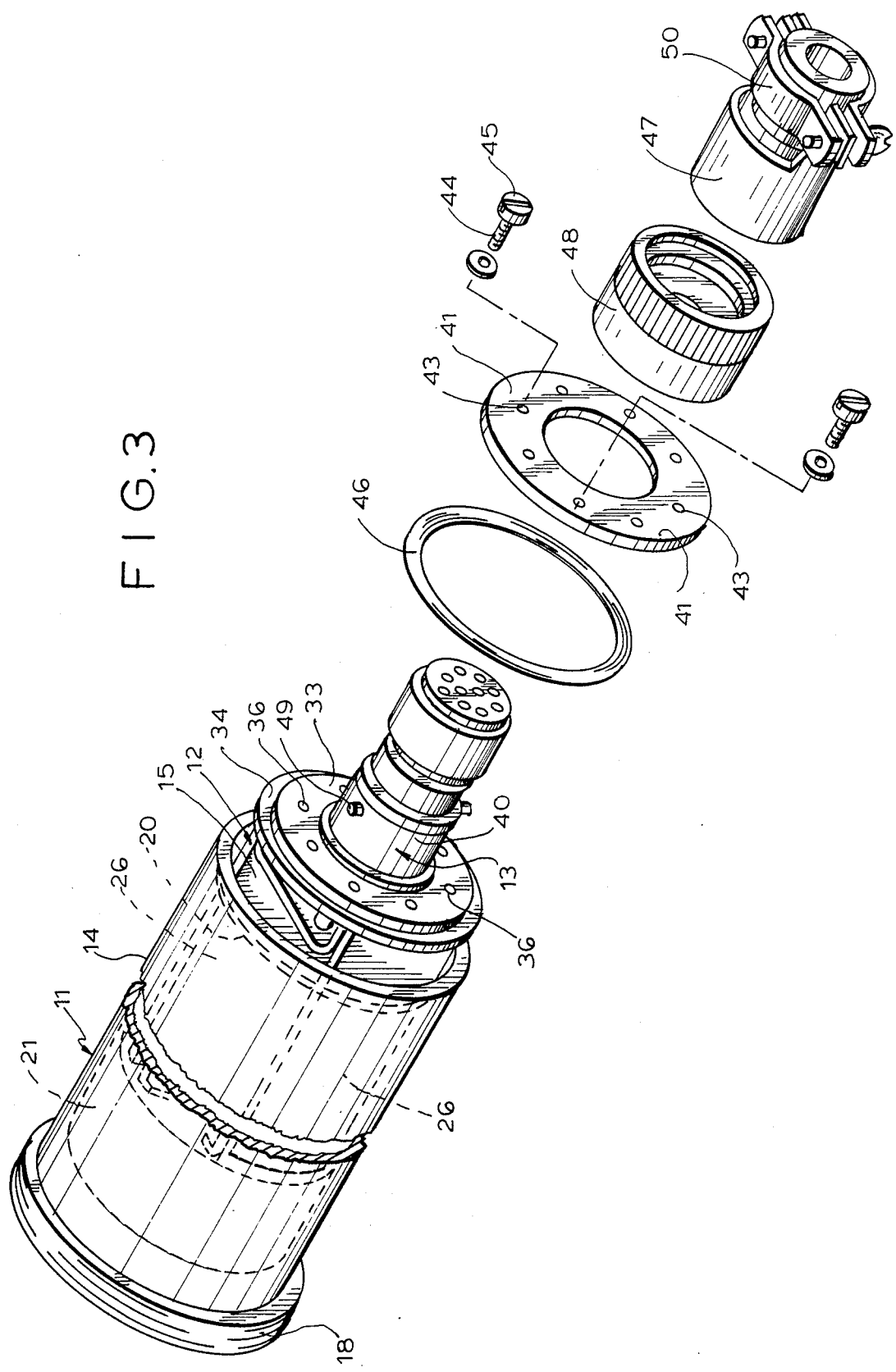
FIG. 3 is an exploded perspective view of the tachometer.

Referring now to the drawings which illustrate a preferred embodiment of the present invention the reference numeral 10 generally designates the improved device as applied to a tachometer providing an analog readout, it being understood that it is applicable to any type of instrument with analog or digital readouts or both. The device 10 includes a housing 11, an instrument unit 11 removably contained within housing 12 and a closure and sealing assembly 13 carried by the instrument unit 12.

The housing 11 comprises a circular cylindrical tubular body member 14 formed of brass, aluminum or other suitable material and open at its rear end to provide an access opening 15. A cover glass 16 engages the front end of body member 14 and sandwiches between its border and the front end face of body member 14 an annulus 17 which extends radially inwardly from the inside face of body member 14 to define an abutment or stop. The window glass 16 and annulus 17 are secured and sealed to body member 14 by a bezel 18 engaging the front border of window glass 16 in any convenient manner, such as soldering or threads.

Formed in the inside face of body member 14 shortly forwardly of access opening 15 is a peripherally extending channel or groove 20 of approximately semicircular transverse cross-section.

The instrument unit 12 includes a front meter 21 which is of cylindrical outside configuration longitudinally slidable in body member 14 and having a dial front face 22 viewable through window glass 16 and a coaxial rotary pointer member 23. The front peripheral border of meter 21 bears on the outer rear border of annulus 17. The meter 21 may be of any desirable type, for example, a DC servo-motor having a rearwardly projecting coaxial stem 24.

A pair of diametrically spaced parallel stiff printed circuit boards 26 project rearwardly from the rear face of meter 21 and are secured at their rear borders to the meter rear face by a pair of right angle brackets 27 which are bolted to the meter rear face and have the printed circuit boards bolted thereto. The rear borders of circuit boards 26 are interconnected by a pair of laterally spaced, parallel U-shaped brackets 28, each of which includes a cross-plate 29 terminating in rearwardly directed opposite legs 30 underlying respective circuit boards 26 and bolted thereto. A circuit network including electronic components are mounted on and interconnected by the printed circuit boards 26, the circuit network output being connected by conductor wires to meter 21 and the input being connected by conductor wires to a multiterminal coupling member for connection to input signals.

The closure assembly 13 includes a circular rear closure plate 33 coaxial with and slidably engaging the inside face of housing body member 14. The rear corner and border of plate 33 is stepped to form a rear peripheral step portion 34. Two laterally spaced pairs of vertically spaced posts 36 are affixed to and project forwardly from the rear face of closure plate 33. Each post 36 has a tapped axial bore aligned with a corresponding smooth bore formed in closure plate 33. The front portions of posts 36 slidably engage respective openings in bracket cross plates 29, the cross plates being retained on the posts by screws 37 sealingly engaging the post tapped bores and having enlarged heads 38 forward of cross plates 29. Encircling each post 36 is a helical compression spring 39 which is entrapped between the rear face of a respective cross plate 29 and the front face of closure plate 33 to resiliently bias or urge brackets 28 and closure plate 33 apart. Axially extending through closure plate 33 and hermetically sealed thereto is a multiterminal electrical coupling section 40.

Figure 4:
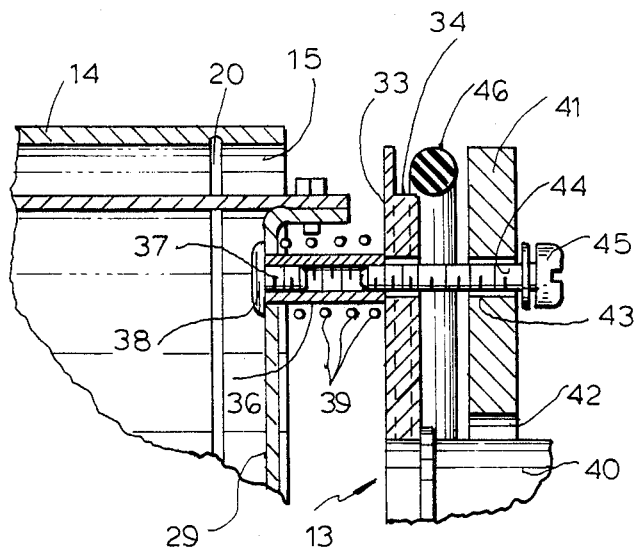
FIG. 4 is a fragmentary longitudinal sectional view of the housing with the instrument unit in partially withdrawn condition.

An annular sealing plate 41 of about the diameter of closure plate 33 is disposed rearwardly of closure plate 33 and has a central opening 42 somewhat larger than coupling 40. Sealing plate 41 has angularly spaced openings, four of which are in axial alignment with the bores in posts 36 and a pair of which are offset and in axial alignment with respective tapped openings in closure plate 33. A long screw 44 with a rear enlarged head 45 engages each threaded bore in a corresponding post 36 and the respective coaxial openings in plates 33 and 41 and a screw 44 with an enlarged head 45 also engages each of the tapped offset openings in closure plate 33 and the respective coaxial openings in sealing plate 41. Thus plates 33 and 41 are spaced apart in the loose condition of screws 44, as shown in FIGS. 4 and 5 and are mutually contracted by tightening screw 44.

An O-ring 46 formed of an elastomeric material such as natural or artificial rubber engages stepped peripheral portion 34 of closure plate 33 and projects rearwardly in the loose condition of screws 44 and is sandwiched between the confronting faces of closure plate stepped portion 34 and the border of sealing plate 41. In the sealed assembled condition of casing 13 and instrument unit 12, closure plate 33 is urged forwardly to load springs 39 which resiliently urge the instrument unit forward with the front face of meter 21 resiliently bearing an annulus 17 and screws 43 are tightened to mutually contract plates 33 and 41 which compress and distort O-ring 46 into tight engagement with the confronting borders of plates 33 and 41, the inside face of housing 11 and the face of groove 20. As a consequence, the housing is hermetically sealed and the instrument unit 12 is locked and resiliently stabilized in the housing.

The coupling section 40 may be of known or conventional construction and associated with coupling section 40 is a mating coupling section 47 which is separably locked in coupled association with coupling section 40 by a locking collar 48 rotatably retained on coupling section 47 and releasably engaging radial pins 49 on coupling section 40. Coupling section 47 is provided with a cable clamp 50 and like coupling section 40 is of known construction.

Figure 5:
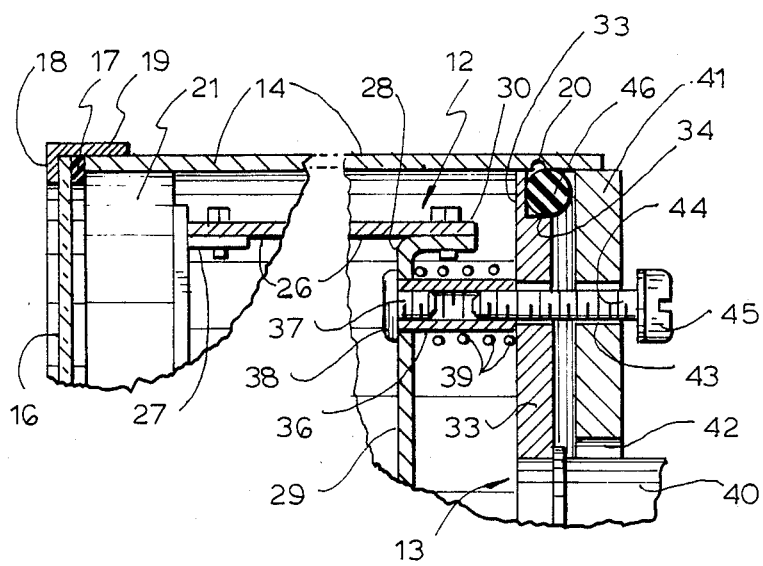
FIG. 5 is a view similar to FIG. 4 with the instrument unit in the housing which is in a loosely closed unsealed condition.
Figure 6:
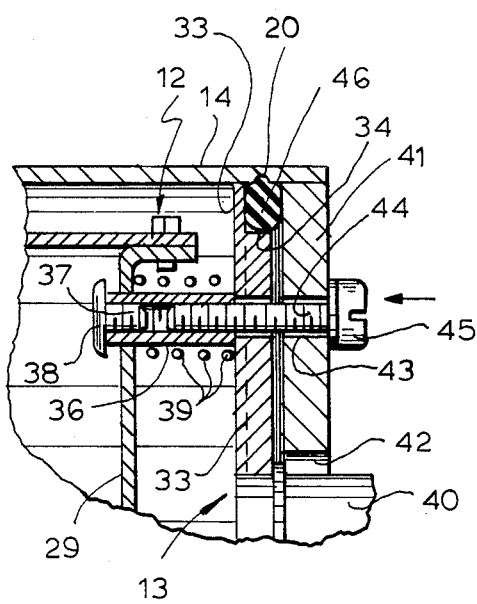
FIG. 6 is a view similar to FIG. 5 showing the closure assembly in its hermetically sealing tightened condition.

In removing the instrument unit 12 from casing 11 screws 44 are loosened, as shown in FIG. 5 permitting O-ring 46 to return to its normal undistorted condition retracted from groove 20. Separation of O-ring 46 from groove 20 unlocks the instrument unit 12 from housing 11 and the partial retraction of closure plate 33 under the influence of springs 39. The unit 12 may now be fully withdrawn from housing 11 for servicing, testing, and maintenance or replacement. In assembling, locking and sealing instrument unit 12 in housing 11 it is merely slid into the housing and screws 44 partially tightened and thereafter, the closure assembly 13 is pushed inwardly to load springs 39 and the screws 44 then tightened to distort O-ring 46 into sealing engagement with the surrounding faces and groove 20 as shown in FIG. 6, to thereby lock unit 12 in locked position and hermetically seal the housing.

While seal 46 is illustrated as an "O" ring and made from natural or artificial rubber, other configurations and other materials may be used, such as an elipse, hexagon, octagon or the like, and may be of a resilient sealing material.

While there has been described and illustrated a preferred embodiment of the present invention is apparent that numerous alterations, omissions and additions may be made without departing from the spirit thereof.

I claimed:

1. A sealed encased instrument for vehicles comprising a tubular housing having a rear access opening, an instrument unit longitudinally slidably housed in the housing and resiliently limited in its forward movement to a predetermined position, a closure member having a releasable coupling for separable electrical conductors and carried by the rear portion of the instrument unit in slidable registry with the access opening, said closure member having a perimeter complementing the inside face of the tubular housing, a locking member corresponding in perimeter to that of the closure member and longitudinally movable relative thereto, the closure and locking member having confronting borders, at least one of said closure member and said inside face of said housing having an annular portion removed therefrom, a deformable resilient gasket sandwiched between said confronting borders and means for mutually contracting the closure and locking members to compress the gasket and outwardly distort it into sealing engagement with the inside face of the housing.

2. The instrument of claim 1 including spring means resiliently longitudinally separating said instrument unit and closure member.

3. The instrument of claim 2 wherein said housing has formed in its inside face proximate the access opening said annular removed portion, said annular removed portion being a peripheral groove, said gasket in its compressed distorted condition engaging said groove to lock said closure member against longitudinal movement.

4. The instrument of claim 3 wherein said spring means are loaded in said locked condition of said closure member to resiliently maintain said instrument unit in said predetermined position.

5. The instrument of claim 4 including a stop located at the forward position of said housing engaging said instrument unit in said predetermined position thereof.

6. The instrument of claim 2 wherein said housing is of circular cylindrical configuration and said closure and locking members comprise parallel circular plates.

7. The instrument of claim 6 wherein said closure member has a plurality of angularly spaced tapped bores and said locking member has a plurality of bores coaxial with said tapped bores and said contracting means comprises screws engaging said tapped bores and the respective bores coaxial therewith.

8. The instrument of claim 6 wherein said gasket comprises an elastomeric O-ring.

9. The instrument of claim 8 wherein one of said closure and locking members confronting borders has a stepped peripheral recess formed therein, said O-ring engaging said recess.

10. The instrument of claim 6 wherein said instrument unit includes a bracket located at the rear thereof and having a plurality of longitudinal openings therein and said closure member includes a plurality of posts projecting longitudinally forwardly therefrom into sliding engagement with respective bracket openings and said spring means includes helical compression springs encircling said posts and entrapped between said bracket and closure member.

11. The instrument of claim 10 including a front meter member and with a circuit carrying printed circuit board adapted to extend between said meter member and said bracket.

12. The instrument of claim 1 wherein said housing is of circular transverse cross section and has a front opening and includes a window glass registering with and closing said front opening.

13. The instrument of claim 12 wherein said instrument unit includes a meter located at its front and having a front face observable through said window glass and being of cylindrical shape and slidably telescoping said housing.

* * * * *